United States Patent [19]

Henze

[11] Patent Number: 4,924,170

[45] Date of Patent: May 8, 1990

[54] CURRENT SHARING MODULAR POWER SUPPLY

[75] Inventor: Christopher P. Henze, Eagan, Minn.

[73] Assignee: Unisys Corporation, Blue Bell, Pa.

[21] Appl. No.: 292,707

[22] Filed: Jan. 3, 1989

[51] Int. Cl.$^5$ .......................................... H02M 3/158
[52] U.S. Cl. .................................... 323/272; 323/285; 363/71
[58] Field of Search ............... 323/271, 272, 285–287; 363/71, 65, 70

[56] References Cited

U.S. PATENT DOCUMENTS

| | | | |
|---|---|---|---|
| 4,194,147 | 3/1980 | Payne et al. | 323/272 |
| 4,257,090 | 3/1981 | Kroger | 363/65 |
| 4,309,650 | 1/1982 | Boros et al. | 323/285 |
| 4,371,919 | 2/1983 | Andrews | 363/65 |
| 4,635,178 | 1/1987 | Greenhalgh | 363/65 |
| 4,672,518 | 6/1987 | Murdock | 323/285 |
| 4,766,364 | 8/1988 | Biamonte et al. | 363/65 |

FOREIGN PATENT DOCUMENTS

| | | | |
|---|---|---|---|
| 73429 | 5/1982 | Japan | 323/272 |
| 949647 | 8/1982 | U.S.S.R. | 323/285 |
| 959054 | 9/1982 | U.S.S.R. | 323/272 |

OTHER PUBLICATIONS

Azzis et al, "Parallel Identical Direct-Mode DC-DC Converters", IBM Tech. Discl. Bul., vol. 25, No. 2, pp. 624, 625, Jul. 1982.

Primary Examiner—William H. Beha, Jr.
Attorney, Agent, or Firm—Arnold L. Albin; Glenn W. Bowen; Robert S. Bramson

[57] ABSTRACT

A regulator circuit for equalizing the load currents of a plurality of power supply modules connected in common to feed a common load. Each of the modules includes a pulse-width modulator for adjusting the duty cycle of the module, thereby to adjust the voltage regulation point and corresponding current output of the module. A current sensor produces a current level signal proportional to the current output of the module. The current level signal is applied through a current amplifier to generate a corresponding variable error voltage. A fixed reference voltage derived from the output voltage and the variable error voltage are applied to the pulse-width modulator to vary the duty cycle so as to produce a decrease in load voltage with an increase in current output and an increase in the load voltage with a decrease in current output thereby equalizing the current output of the module with modules having substantially equal output voltages. A low pass filter interposed in the regulator feedback path assures current sharing under quasi steady-state conditions without degradation of high frequency response to dynamic load changes.

17 Claims, 5 Drawing Sheets

CURRENT SHARING MODULAR POWER SUPPLY

BACKGROUND OF THE INVENTION

1. Field of the Invention

The present invention is directed generally to electrical power supplies, and more particularly, to a system for regulating a power supply which includes circuitry to permit equalizing current between a plurality of power supply modules which are coupled together to allow each module to supply substantially the same current to a power distribution bus.

2. Description of the Prior Art

It is known in the prior art that it is often advantageous to provide a plurality of power supply modules to drive a particular load rather than to design and construct a single power supply for that purpose. A module comprises a unitary power supply of a given configuration. These advantages come from several sources, such as being able to utilize readily available components rather than requiring power components that may be unduly expensive or unavailable in the present state of the art. There is an advantage in being able to design and construct standardized individual power supply units that can be selected and utilized in plurality for driving a particular load under consideration. Also, a margin of safety can be designed into such a system by providing more power supply modules than would normally be required in order to accommodate failures in individual supplies.

It has been common in the prior art systems that involve the use of multiple power supply modules to drive a given load to operate the modules in a current limit mode. This mode of operation results in the majority of the individual power supply modules being operated at the maximum power output capacity, with only one module taking up the balance of the power required for the particular load. Consider, for example, where a particular load has six modules coupled to it and the output capacity of four of the modules operating at maximum output is not sufficient to drive the load. Four of the modules would be operated at the maximum capacity with the balance of the load supplied by the fifth module. In such a configuration, the sixth module supply would not be operative and would be idle. In such a system, if the load were variable and would increase beyond the capacity of the fifth power supply module when added to the four modules operating at maximum capacity, the sixth module would then be brought into operation to supply the balance of the load. It is apparent that the system must be designed such that the maximum load that can be encountered may be supplied by the number of modules available.

It is clear, however, that a power supply of this configuration results in unequal stress on the power supply modules, since some of the modules are operating at maximum capacity at all times, some of the modules are operative at varying capacities depending upon load requirements, and some of the modules may be inoperative for long periods of time. The stress resulting from such operation tends to result in a higher failure rate for those modules that are operated at maximum capacity for the greatest length of time.

It has been found that parallel coupled power supply modules with output impedances known to be substantially equal can be made to share common loads by maintaining the amplitude of the generated voltages substantially equal. Because it is impossible to guarantee that the output voltage for two or more conventional modules will be exactly the same, very poor current paralleling characteristics are obtained in the prior art. As an example, FIG. 1 shows an ideal conventional power supply, which appears as a constant voltage source for output currents less than a limit point at which the output current is limited to a maximum level to prevent damage to the power supply in the even of a shorted output, and which appears as a constant current source for overload conditions as shown in FIG. 2X. Output voltage and current characteristics are shown for three conventional power supply modules in FIG. 3. A first power supply module, denoted by PSM1, has an output voltage of 5.050 volts and a current capacity of 40 amp. A second power supply module PSM2 has an output voltage of 5.025 volts and a current capacity of 35 amp. The third supply module, PSM3, has an output voltage of 5.000 and a maximum current capacity of 42 amp. If the three modules are parallelled, module PSM1 will provide the entire load current due to its higher available supply voltage until the load current exceeds the total current limit threshold of 40 amp. When module PSM1 enters the current limit, the supply voltage drops out of regulation and module PSM2 picks up the additional load current until the load is increased to the point where module PSM2 enters current limit. Module PSM3 then picks up the additional current requirement until the maximum output current is reached. A corresponding graph of output voltage and current for the three modules operating in parallel is shown in FIG. 4.

Prior art modular power systems are designed to operate in this manner. However, it is a disadvantage that one power supply module must go into the overload current limiting mode before a second module starts to contribute power to the load. The module that produces the highest output voltage will run the hottest and thus may be expected to fail first. The dynamic response of the system also suffers because one supply must regulate the output voltage for the other supplies that are in the current limit. Further, prior art systems require complex interconnections for sensing the current supplied by each individual module and controlling the supplies to equalize the currents applied to the load.

The present invention has been designed to permit parallel operation without requiring any additional coupling of control signals between modules for current balancing. The invention allows power supply modules to operate in a voltage regulation mode and contribute substantially equal portions of current to a common output load. Current sharing is accomplished even though the output voltage regulation characteristics are not exactly matched between the various power supply modules.

SUMMARY OF THE INVENTION

The present invention provides a regulator circuit for equalizing the load currents of a plurality of power supply modules connected in common to feed a common load, each of the modules including a modulator responsive to an externally produced pulse-width signal for adjusting the duty cycle of the module, thereby incrementally to adjust the voltage output of the module. The invention comprises a current sensor responsive to a load current of an individual module for producing a current level signal which is indicative of the current output of the module. The voltage developed across the load of the module is used to provide a variable voltage signal proportional to the load current. An amplifier is responsive to the variable voltage signal and a reference voltage signal and generates a pulse-width signal such that the duty cycle of the modulator is adjusted to decrease the load voltage of the module when current output increases and increase the load voltage in accordance with a decrease in current output. The pulse-width signal is applied to the modulator so that the duty cycle of the module is adjusted to substantially equalize the load current of the control module with each other of the plurality of power supply modules, wherein each of the modules is adjusted substantially independently of the current provided by all of the other modules, and each module provides substantially the same regulated output voltage. A low pass filter interposed in the regulator path provides current sharing in steady-state or slowly varying conditions, but, high frequency response to dynamic load changes is not degraded. This is because at high frequencies the variable regulator feedback signal is greatly attenuated.

DESCRIPTION OF THE PREFERRED EMBODIMENT

Figure 1:
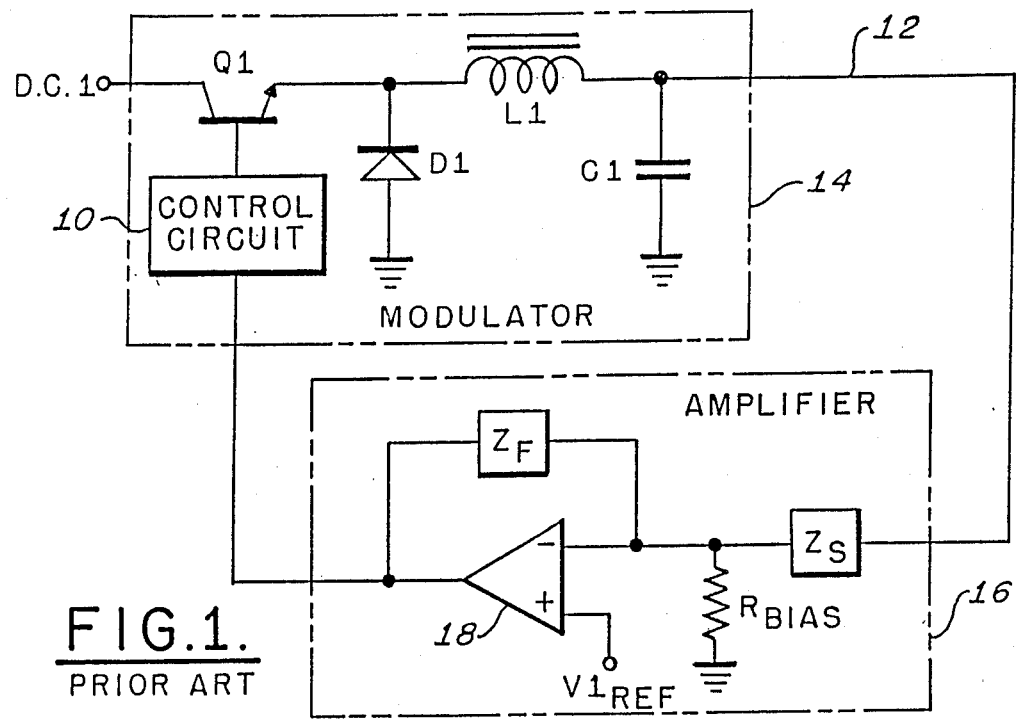
FIG. 1 is a schematic diagram of a power supply regulator of the prior art.

Referring now to FIG. 1, there is shown a simple regulator circuit for a buck type power supply. (after H. D. Venable, "The K Factor; A New Mathematical Tool for Stability Analysis and Synthesis", *Proc.* Powercon No. 10, Mar. 22-24, 1983, pp 1-11). A switching transistor 01 is coupled to a d.c. source DC1 and provides a pulse output at a predetermined pulse rate whose duty cycle is controlled by control circuit 10 in a conventional manner. The output of 01 is applied to a diode D1, a smoothing inductor L1 and a filter capacitor C1 to provide a rectified d.c. output 12. The power processing block 14 is referred to as the modulator. An error detecting amplifier 16 comprises a differential amplifier 18 feeding back a supply voltage signal to the modulator 14. Feedback resistor $Z_F$, series resistor $Z_S$, and bias resistor $R_{BIAS}$ are conventional components as are well known in the art. The voltage $V1_{REF}$ is a predetermined reference voltage for the amplifier section of the power supply. The output voltage of the modulator on lead 12 is compared against the reference $V1_{REF}$ to generate an error signal which provides output voltage regulation by varying the duty cycle of control circuit 10 and transistor switch Q1. If the reference voltage is changed, the output voltage of the power supply will respond with a proportional change.

Figure 5:
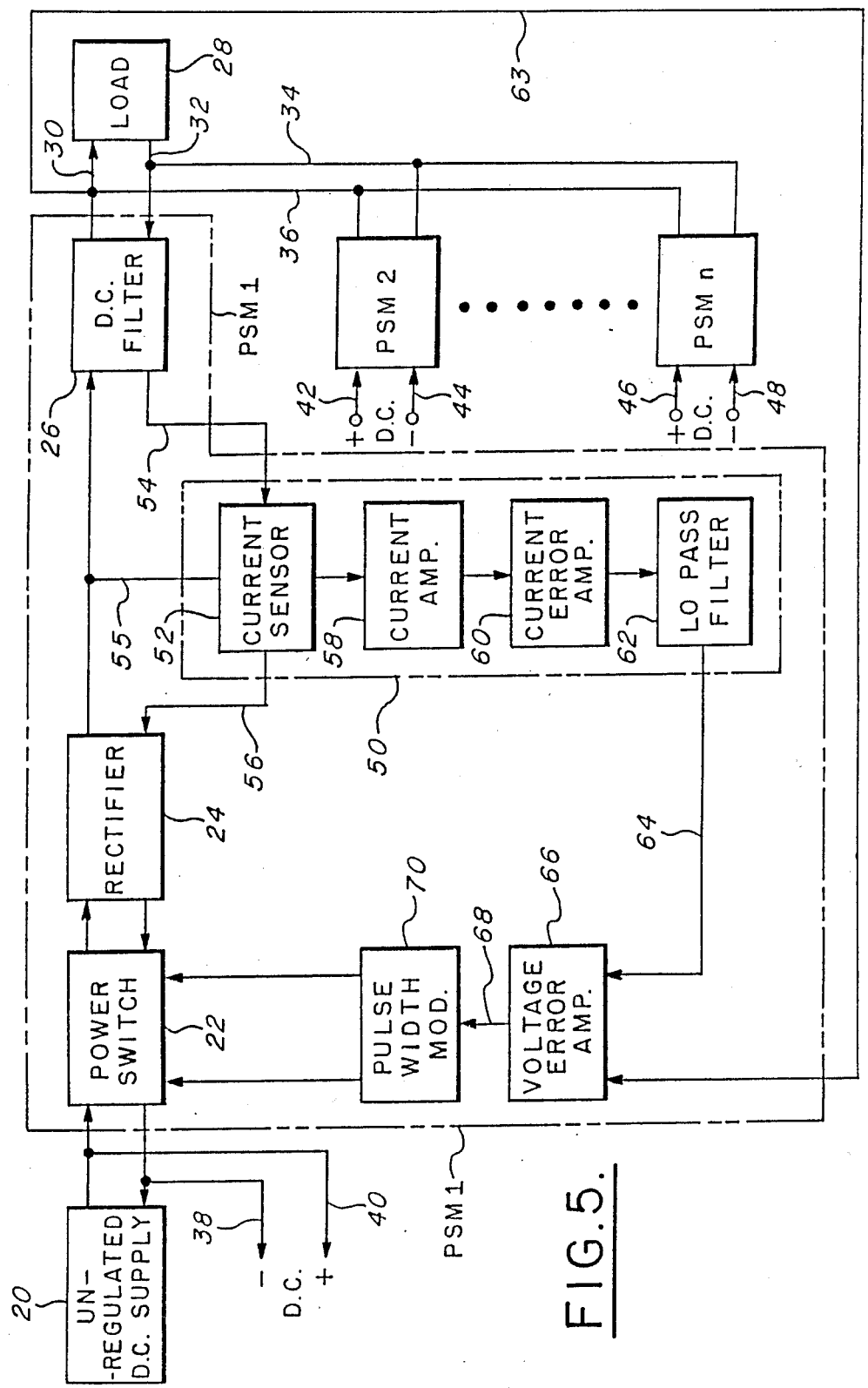
FIG. 5 is a block diagram of a preferred arrangement of a parallel coupled load-sharing power supply module according to the present invention.

A block diagram of the current equalizing modular power system of the present invention is illustrated by FIG. 5. An unregulated d.c. supply 20 is applied to the input of a conventional power supply module PSM1 whose function is as described with respect to FIG. 1. The d.c. voltage input from supply 20 is applied to power switch 22 which produces at its output a pulse-width modulated direct current voltage which, in an illustrative embodiment of the present invention, is typically in order of 5.0 volts d.c. A rectifier 24 and filter 26 operate in a conventional manner to provide substantially ripple-free d.c. output to a load 28.

The direct current voltage at the output 30, 32 from the rectifier filter network 26 is coupled by lines 34, 36 to a second power module PSM2 and optionally to a plurality of additional power supply modules labelled PSMn. The output voltage of supply 20 may be applied on lines 38, 40 to corresponding inputs 42, 44 and 46, 48 of power supply modules PSM2 through PSMn or the individual modules may operate from their own unregulated power source. Likewise, the d.c. output of power supplies PSMn and PSM2 are coupled by lines 34 and 36 to the load 28. It should be noted that the circuitry of the first power module PSM1, the second power module PSM2, and further power modules PSMn are substantially identical to each other and the following description of the circuitry will concentrate primarily on the circuitry of the voltage regulator 50. Each of the power supply modules further comprises a substantially identical voltage regulator 50.

A current sensor 52 is coupled in series with a lead 54 of the d.c. return signal on line 32 from load 28. Continuity from current sensor 52 is provided through lead 56 to rectifier 24 and power switch 22. The output of current sensor 52 is applied to a current amplifier 58 and coupled to a current error amplifier 60 where it appears as a voltage proportional to the current in sensor 52 for comparison with a source of reference voltage (not shown). The output of current error amplifier 60 is applied to a lowpass filter 62 which slows down the response of the current sharing circuitry 50 at high frequencies so that the dynamic performance of the power supply module will not be affected by the additional circuitry, in a manner to be described. The output of lowpass filter 62 is coupled on a lead 64 to a voltage error amplifier 66 which provides an output linearly proportional to the load current provided by PSM1. An output voltage signal is coupled on lead 63 from node 30 to a second input of amplifier 66, where it is applied in a differential manner along with the current signal on lead 64. Error amplifier 66 is coupled by lead 68 to pulse width modulator 70 which provides a pulse width modulated output proportional to the amplitude of the applied voltage at a predetermined repetition rate. The circuits that comprise the pulse width modulator circuitry are logic circuits that are well known and available commercially and will not be described in detail as to their electrical function, it being understood by those skilled in the art that modulator 70 provides an output which when coupled to power switch 22 adjusts the duty cycle in accordance with the voltage output of regulator 50 and thereby regulates the current or regulated voltage output of module PSM1.

Figure 6:
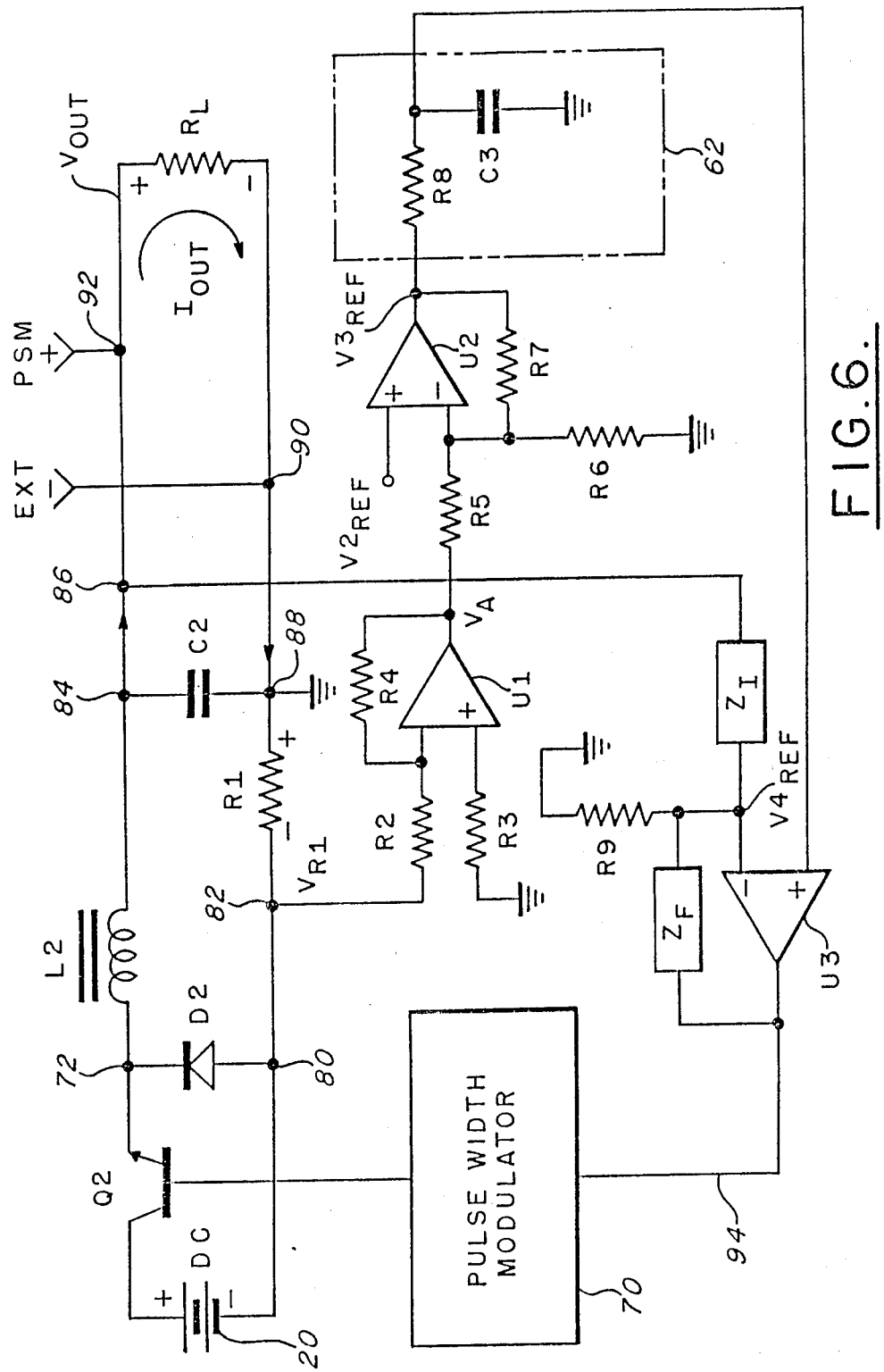
FIG. 6 is a schematic diagram of a preferred embodiment of a current sensor and amplifier for use in the arrangement of FIG. 4.

Referring now to FIG. 6, the control circuitry that embodies the subject invention will be described in detail. Since each power supply module PSMn is the same as all other supplies and each control circuit 50 is the same as all other control circuits, only one such circuit will be described in detail. The unregulated d.c. voltage 20 is applied to the collector of transistor Q2 which may comprise a power NPN transistor. The emitter electrode is coupled to the junction of the cathode of diode D2 and one terminal of an inductor L2. The anode of diode D2 is connected to the ground return of the d.c. voltage supply 20. The base of transistor Q2 is fed by pulse width modulator 70 for receiving the pulse width modulation control signals. The other end of inductor L2 is coupled at a junction 84 to one terminal of a shunt filter capacitor C2, whose other terminal is coupled to ground at junction 88. Junctions 84 and 88 are coupled to a load impedance $R_L$. As shown, current is flowing through impedance $R_L$ in a direction so as to provide the polarity indicated. However, the reverse polarity may also be provided with suitable connections to the diode rectifier and choice of the transistor power switch. Additional power supply modules may be connected to junctions 90 and 92 to place them in parallel with the output of the power supply module depicted in FIG. 6.

Figure 7:
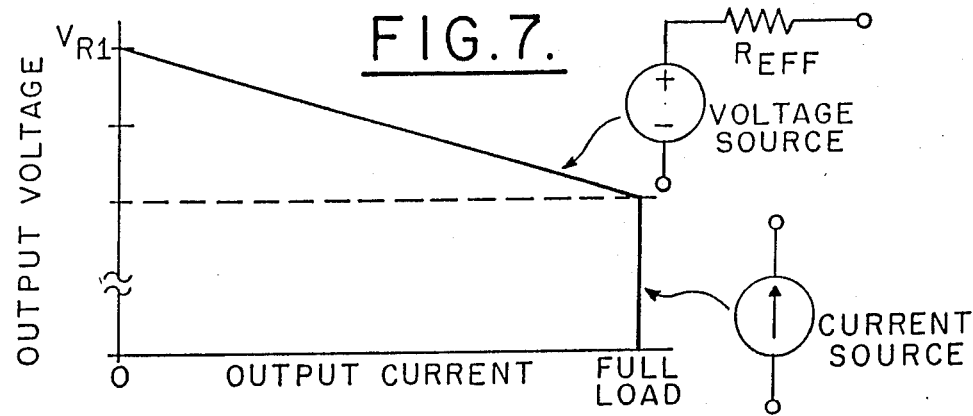
FIG. 7 is a graph of output voltage versus output current for a power supply module of the present invention.

Coupled in the current return path between junctions 82 and 88 is a series impedance R1, which functions as a current sensor. The power supply module is designed so that the steady-state output voltage reduces slightly with increasing output current, as shown in FIG. 7. An effective impedance is produced which typically is of the order of 2.5 mOhm for providing an output voltage which drops by 1 or 2% from no load to full load. However, the actual impedance used is of the order of 0.8 mΩ since otherwise power and space would be uneconomically required. For example, a 2.5 mΩ resistor has a dissipation of 4-watts in 5 volt 40 amp power supply. This 4-watt power loss represents a 2% loss in power supply efficiency or 10% of the total loss in a power supply having an 80% over-all efficiency. In the present invention, a small signal voltage developed across impedance R1 is proportional to the output current of the power supply module. By subtracting the small signal voltage developed across the minimal series impedance from an internally supplied constant voltage a variable reference voltage may be produced for output regulation. This reference voltage is then applied to control the pulse width modulator. The effective output impedance introduced by the sensing circuitry may be restricted to essentially low frequencies by providing internal circuitry with a high frequency roll off, typically with a break point at approximately 100 Hz. Thus, the dynamic output characteristics of the power supply module are not diminished.

It has been determined that the output current balance between power supply modules connected in parallel is predominantly dependent on matching the output voltages at no load (or at a fixed load). The output voltage of a power supply module is dependent on output current and is given by:

$$V_{OUT} = V_{N1} - R_{EFF} I_{OUT} \qquad (1)$$

where $V_{N1}$ is the output voltage of the module that would be obtained at no load and $R_{EFF}$ is the effective low frequency resistance seen by the load resistor. If it is assumed that the effective output resistance of two parallel power supply modules are equal, the current imbalance $\Delta I_{OUT}$ resulting from a mismatch in no-load output voltage is found to be:

$$\Delta I_{OUT} = \frac{\Delta V_{N1}}{R_{EFF}} \qquad (2)$$

where $\Delta V_{N1}$ is the voltage difference between the modules. If it is assumed that the no-load voltages are matched, the output current sharing is inversely proportional to the ratio of output resistances, thus:

$$\frac{I_{OUT1}}{I_{OUT2}} = \frac{R_{EFF2}}{R_{EFF1}} \qquad (3)$$

where subscripts number 1 and number 2 refer to the respective first and second power supply modules. Since a 5% difference in effective output resistance between two parallelled modules will result in only a 5% output current imbalance, exact matching of effective output resistances is not critical for current sharing. On the other hand, a 5% difference in no-load output voltages between parallel modules could cause a current imbalance large enough to force one module into current limit before the second module starts to support the load. Therefore, the output current balance between the parallel modules is predominately dependent on matching the output voltages, as indicated above. Thus, the present invention relies on control of the output voltage of each individual module in accordance with its developed current output, and is substantially independent of the currents in each of the associated parallel modules.

Referring again to FIG. 6, with continued reference to FIG. 5, current sensor 52 comprises series impedance R1. Current amplifier 58 is comprised of an operational amplifier U1, an offset bias resistor R3 and gain resistors R2, R4. Typically, resistors R2, R3, and R4 have values of 1K, 1K, and 68K ohms, respectively. Resistor R2 is coupled between junction 82 at the return side of impedance R1 and the inverting input of operational amplifier U1. Resistor R4 is coupled between the junction of resistor R2 and the inverting input to the output of operational amplifier U1. Bias resistor R3 connects between the non-inverting input to the operational amplifier and the signal ground. Amplifier U1 is used to produce a voltage that is proportional to the output current by sensing the voltage drop across impedance R1.

When impedance R1 is applied in the position shown, both the d.c. output current of the power supply and the a.c. ripple current in the inductor L2 are sensed. In general, the circuit will be designed so that the roll-off frequency of the amplifiers will reject the ripple frequency. For example, a typical ripple frequency for a power supply might be 100 kHz, whereas the output voltage regulation loop might have a closed-loop crossover frequency of 10 kHz, and roll-off frequency of the current sharing circuitry may be of the order of 100 Hz.

Impedance R1 could also be placed between junctions 88 and 90 where only the d.c. output current is to be measured, independent of the ripple. If there was a very large a.c. ripple current, it would be advantageous to place the shunt at the alternate location to avoid high power losses. The use of a series impedance as indicated is only one technique for measuring current, and other suitable techniques, such as the use of a current probe or other inductive sensors could also be used rather than inserting a series impedance.

The voltage across impedance R1 is:

$$V_{R1} = -I_{OUT} R1 \quad (4)$$

and is amplified by amplifier U1 to provide an output voltage $V_A$ which is proportional to the average output current $I_{OUT}$ as follows:

$$V_A = \frac{R_4 R1}{R2} \quad (5)$$

$$I_{OUT} = K I_{OUT} \quad (6)$$

where the factor K is a coefficient of proportionality relating the sensed voltage to the output current. The gain provided by amplifier U1 results in effectively increasing the effective impedance of R1 so that a relatively small value may be used to produce an appreciable sensed current. Typically, current $I_{OUT}$ is of the order of 10–40 amp. Shunt capacitors may also be added in this stage for additional low-pass filtering if desired. Additional capacitors may be needed to filter high frequency switching noise produced in the power supply.

Referring now to the second stage, a differential amplifier U2 produces an output voltage $V3_{REF}$. The signal $V_A$ representative of the average output current $I_{OUT}$ is applied through a bias network R5, R6 to the inverting input of operational amplifier U2. Resistor R7 is coupled from the inverting input of the output of amplifier U2. Typical values for R5, R6, and R7 are 100KΩ, 10.5KΩ and 2.8KΩ, respectively. Reference voltage $V2_{REF}$ is produced by conventional means and is independent of the operating conditions of the power supply. Typically it is of the order of 2.5 V. The output amplifier U2, $V3_{REF}$, is derived by subtracting the signal $V_A$ from the reference voltage $V2_{REF}$. The voltage $V_A$ is determined by the output current of the power supply. Thus, as the output current of the power supply is increased, the output voltage of amplifier U2 is decreased, and as the output current of the power supply is decreased, the output voltage of the amplifier is increased. By applying the signal $V3_{REF}$ to control the pulse width modulator 70, the output voltage of the power supply may be increased or reduced inversely in accordance with the output current of the power supply. The output signal $V3_{REF}$ may be found from the following relationship:

$$V3_{REF} = \left[ \frac{(R5 + R6 R7 + 1)}{(R5 R6)} \right] V2_{REF} - K I_{OUT} \left( \frac{R7}{R5} \right) \quad (7)$$

As with operational amplifier U1, low-pass and high frequency filter capacitors may be added to the second stage circuit if desired. For this purpose, low-pass filter 62 is shown coupled from the output of operational amplifier U2 to the input of a further operational amplifier U3 operating as voltage error amplifier 66. Other locations in the circuit would also be suitable for low-pass filtering. Since the filter has a frequency domain transfer characteristic of:

$$\frac{V4_{REF}(f)}{V3_{REF}(f)} = \left[ \frac{1}{1 + (2\pi f R8\ C3)^2} \right]^{1/2} \quad (8)$$

the output current $I_{OUT}$ is a function of frequency. At low frequencies, $V4_{REF}$ and $V3_{REF}$ will be of the same magnitude. The signal $V4_{REF}$ is the reference voltage for the pulse-width modulator of the power supply and is the signal against which the output voltage of the power supply at node 86 is compared to perform output voltage regulation. Thus, if the signal $V4_{REF}$ is changed, the output voltage of the power supply will respond with a proportional change. Amplifier U3 is a conventional operational amplifier having a non-inverting input coupled to receive the signal $V4_{REF}$ from filter 62 and an inverting input coupled to receive the output voltage of the power supply module through a series impedance $Z_I$. The inverting input of amplifier U3 is coupled through a series impedance $Z_I$ and a bias resistor R9 to signal ground and through a shunt feedback resistor $Z_F$ to the output of the amplifier. The amplifier output is coupled on a lead 94 to an input of pulse width modulator 70. It may be seen that amplifier U3 is identical to and operates in an identical manner as amplifier 18 of FIG. 1.

The functioning of the pulse-width modulator circuit can be further understood by reference to a specification sheet of a commercial component, such as Unitrode UC1524, published in the "Linear Integrated Circuits Data Book", IC500, Unitrode Corporation, Merrimack, NH, 03054.

In operation, when the output voltage $V_{OUT}$ tends to go high and results in an imbalance of current supplied by the power supply module, it results in a decrease in the feedback input to the inverting terminal of operational amplifier U3, as compared to the reference voltage $V4_{REF}$ generated by the sensed current through impedance R1, and causes U3 to produce a reduced output control voltage on line 94 thereby controlling the pulse width modulator 70 to shorten the duration of its output pulses thereby decreasing the duty cycle of the power transistor Q2. This results in a reduced average current, and regulated supply voltage through the power supply module. Similarly, when the supply voltage $V_{OUT}$ decreases, the duty cycle and regulated voltage will be adjusted upward to maintain a regulated output current. The control voltages $V_A$, $V2_{REF}$, $V3_{REF}$, and $V4_{REF}$ are variable and would have movement upward or downward depending upon the balance conditions of the operational amplifiers U2 and U3, respectively. It is, of course, apparent to those skilled in the art that power supplies providing different output voltage and current levels can be designed without departing from the scope and spirit of the invention.

Figure 8:
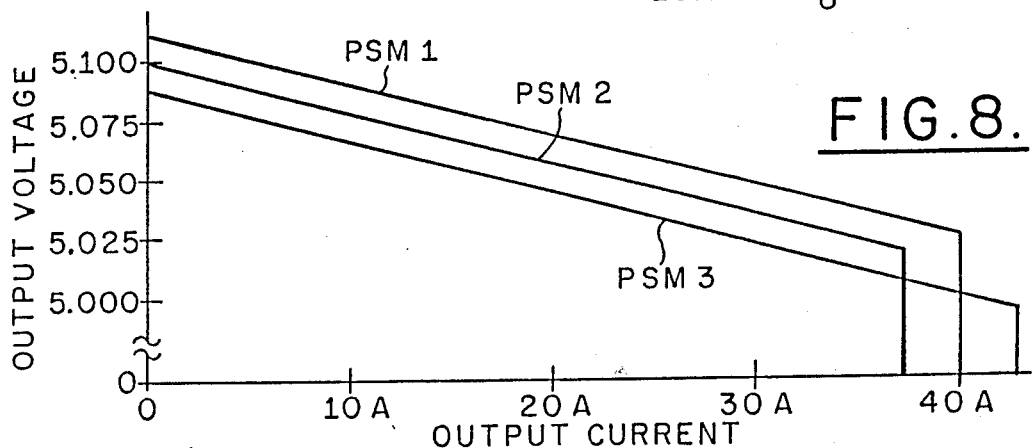
FIG. 8 is a graph of output voltage versus output current for a plurality of parallel connected power supply modules as in the present invention.
Figure 9:
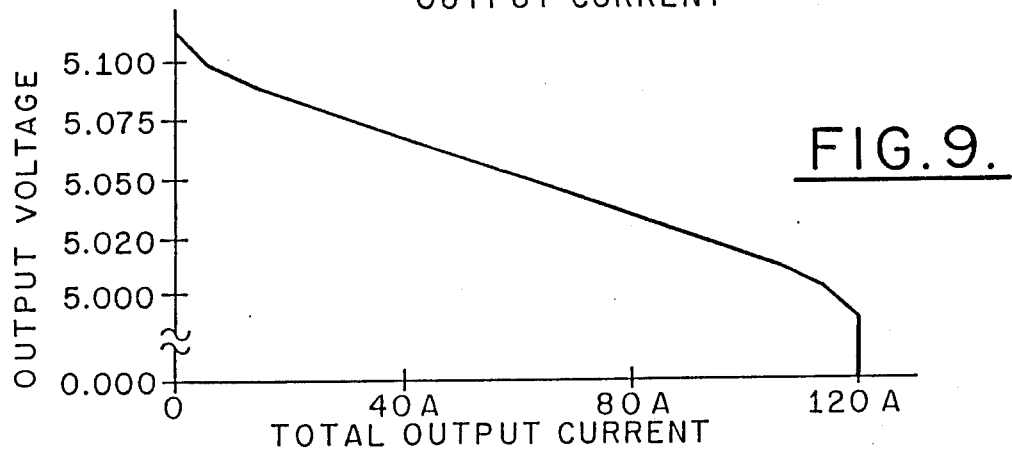
FIG. 9 is a graph regulated output voltage versus total output current for three parallel power supply modules as in the present invention.
Figure 10:
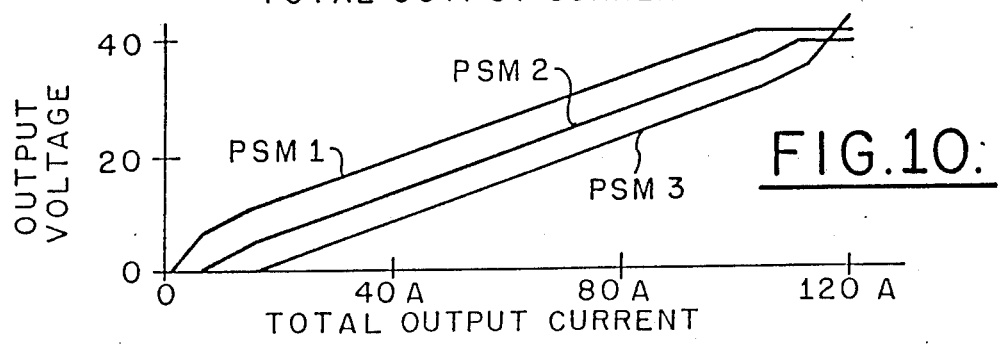
FIG. 10 is a graph of the output current contribution of each power supply module as a function of total load current.

As an example, the output voltage and output currents for three parallel power supply modules are shown in FIG. 8. The resulting output voltage as a function of output current is shown in FIG. 9 and the current contribution of each power supply module as a function of total load current is shown in FIG. 10.

Figure 11:
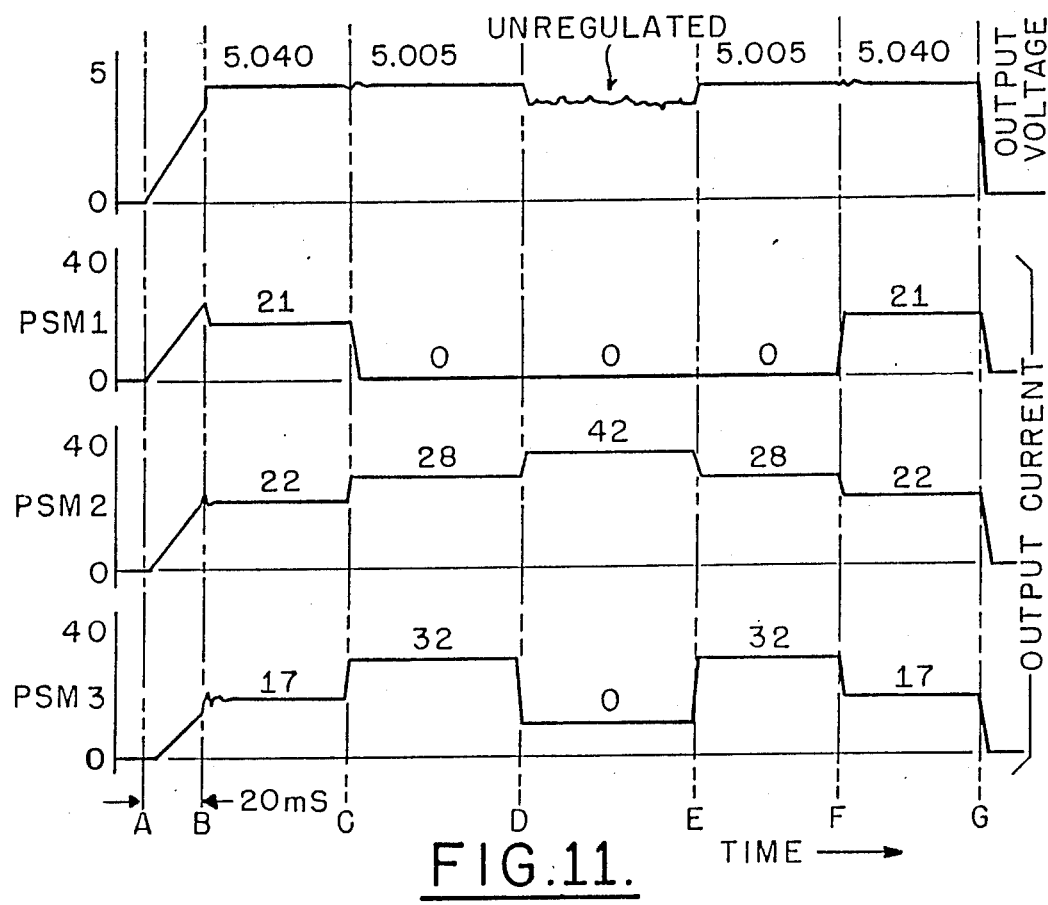
FIG. 11 is a graph of output voltage versus output current as a function of time for three parallel power supply modules useful in explaining the operation of the invention.
Figure 2:
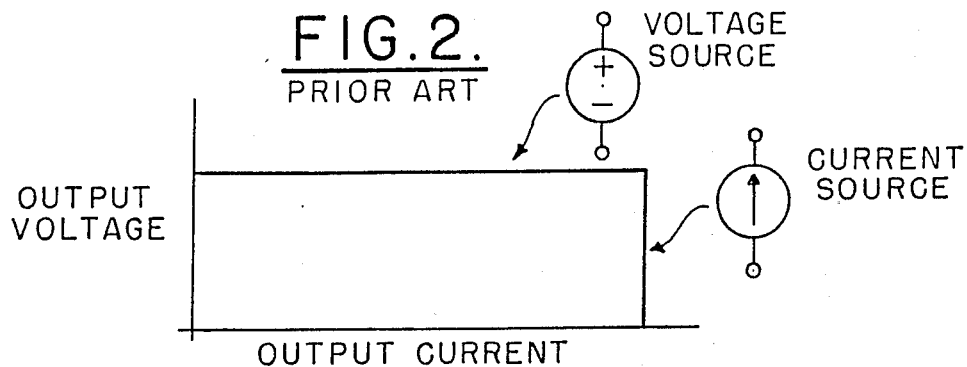
FIG. 2 is a graph of output voltage versus current for a current limited power supply module of the prior art.
Figure 3:
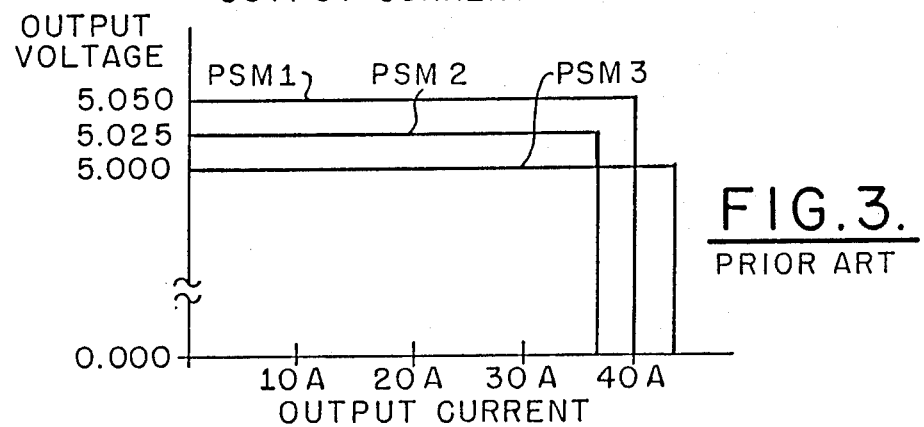
FIG. 3 is a graph of output voltage versus output current for a plurality of current limited power supplies of the prior art wherein the output voltages are similar but not identical.
Figure 4:
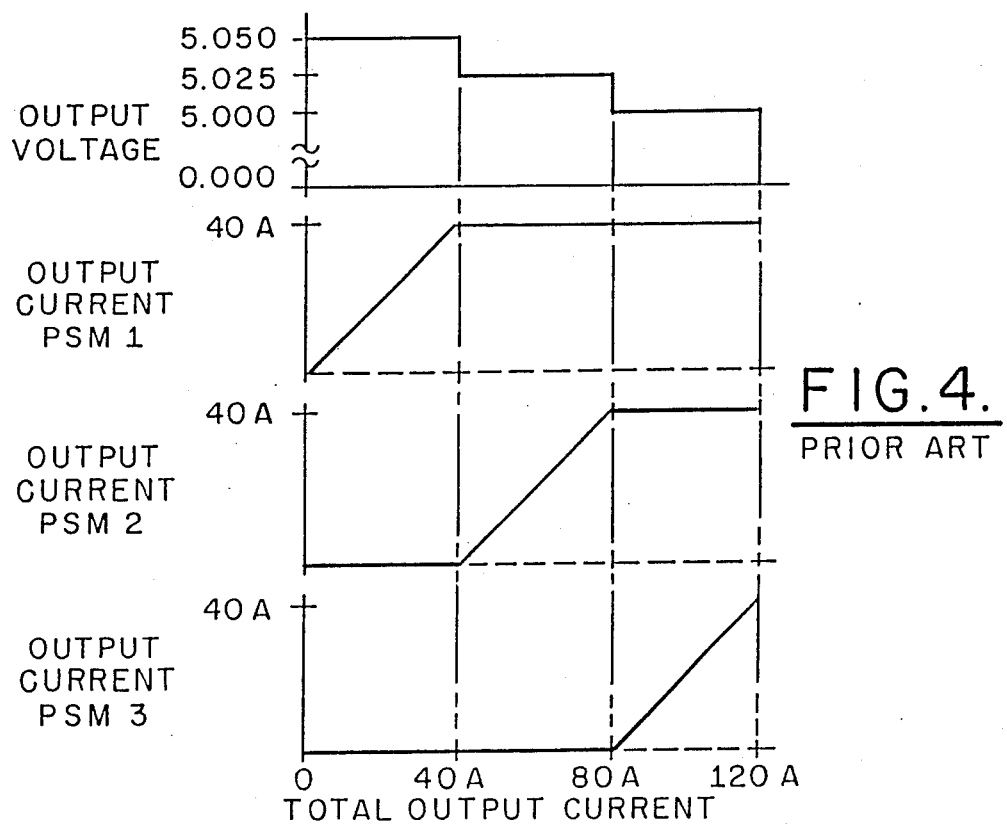
FIG. 4 shows graphs of output voltage versus current for individual power supply modules interconnected in parallel as in the prior art.

The output voltage and output currents for three parallel power supply modules as a function of time are shown in FIG. 11. The specific numerical values shown are intended only to depict typical values, and are not to be construed as limiting. At the ordinate, represented as time 0 and current 0, the system is initially turned off. Upon application of input power, during the interval A-B, which is approximately 20 ms in duration, intermediate capacitances are slowly charged. The output voltage is then ramped by slowing incrementing the duty ratio of the power switching transistors in the power supply modules. During this interval, the modules will operate in a discontinuous conduction mode which provides some inherent current sharing even if the modules have different start-up delays. At time B, the output voltage is close to the rated value and the modules enter into a normal operating mode. Thus, the output voltage is approximately 5.0 volts and each supply is delivering approximately 20 amperes. During time segment B-C, it is assumed that the steady-state output voltage is 5.040 vdc. At this voltage, module PSM1 contributes 21 amp, module PSM2 contributes 22 amp, and module PSM3 contributes 17 amp for a total output load current of 60 amp. It may be seen that there is an imbalance in the current, load module PSM2 carrying the greatest load while PSM3 carries the smallest load. It is assumed for this example that the modules are remotely turned on and off. At time C, module PSM1 is turned off leaving modules PSM2 and PSM3 to pick up the load. To find a new current balance point, the output voltage drops by 0.035 V to 5.005 V. At this voltage, module PSM2 contributes 28 amp and module PSM3 contributes 32 amp, to maintain a total load current of 60 amp. At time D, module PSM3 shuts off, leaving only PSM2 to support the load. Because the load will draw 60 amp at 5V, module PSM2 enters into a current limit mode in which the output current is limited to 42 amp, hence the output voltage must drop out of regulation. At time E, module PSM3 is turned back on. This results in a regulated output voltage of 5.005 and the same current relationship as in time interval C-D. At time F, module PSM1 is turned back on and the output currents are balanced as in their initial state during interval B-C.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A regulator circuit for equalizing the load currents of a plurality of power supply modules connected in common to supply a common load voltage, each of said modules comprising modulator means for adjusting the load current of said module substantially independently of load current changes in any other module, current sensing means responsive to a load current of said module for producing a current signal indicative of said load current of said module, voltage sensing means responsive to its load voltage for providing a first voltage signal corresponding thereto, and means for applying said current and voltage signals to said modulator means, said modulator means being constructed so that said load current is adjusted in a substantially inversely proportional manner to changes in its load voltage, wherein said modulator means comprises pulse width generator means responsive to said current level and said first voltage signal for producing a pulse width signal such that said duty cycle is adjusted to incrementally decrease said load current of said module with an increase in load voltage, and to incrementally increase said load current with a decrease in load voltage, said current sensing means further comprising means responsive to said load current for providing a second voltage signal proportional thereto, means for providing a predetermined reference voltage, and first circuit means responsive to the difference of said predetermined reference voltage and said second voltage signal for providing an error signal representative thereof, said regulator circuit further comprising second circuit means which is responsive to the difference of said error signal and said first voltage signal for producing pulse signals which have pulse widths that are linearly proportional to the difference between said error signal and said first voltage signal.

2. A regulator circuit as set forth in claim 1, further comprising low-pass filter means for receiving said error signal and for passing all frequencies components of said error signal that are less than a predetermined frequency and for rejecting all frequencies components of said error signal that are greater than said predetermined frequency.

3. A regulator circuit as set forth in claim 2 wherein said predetermined frequency is approximately 100 Hz.

4. A regulator circuit as set forth in claim 3 wherein said low-pass filter means has an input and an output coupled intermediate said first circuit means and said second circuit means.

5. A regulator circuit as set forth in claim 4 wherein said current sensing means comprises an impedance element coupled in series with said load current of said one of said modules, and said current level signal is produced by sensing the voltage difference developed across said impedance element.

6. A regulator circuit as set forth in claim 5 wherein said regulator circuit comprises offset bias signal means and said current sensing means further comprises first difference means having a first input that is coupled to receive said sensed voltage difference, a second input coupled for receiving said offset bias signal, and an output coupled to said first circuit means for producing said second voltage signal.

7. A regulator circuit as set forth in claim 6 wherein said first circuit means comprises a second difference means having a first input coupled to receive said predetermined reference voltage, a second input coupled to the output of said first difference means, and an output coupled to said input of said low-pass filter.

8. A regulator circuit as set forth in claim 7 wherein said low-pass filter means further comprises an output terminal for providing a filtered error signal independent of high frequency signal components to said input of said second circuit means.

9. A regulator circuit as set forth in claim 8 wherein said second circuit means comprises a third difference means having a first input terminal coupled to the output of said second difference means and a second input terminal coupled to receive said first voltage signal wherein said third difference means generates said pulse width signal.

10. Regulator means for a first power supply module that is capable of being coupled to a common load that is supplied by at least one other power supply module in a common current sharing configuration comprising current sensing means responsive to the load current supplied by said first power supply module for producing a first signal, voltage sensing means responsive to its load voltage for producing a second signal, adjustment means for regulating the load current supplied by said first power supply module in response to an adjustment signal, and adjustment signal means responsive to both said first and second signals for producing said adjustment signal which directs said adjustment means to adjust said load current of said module in an inversely proportional manner to changes in its load voltage and substantially independently of the load current and load voltage change of any other module, wherein said adjustment means comprises pulse signal means for generating a pulse-width modulated signal in response to said adjustment signal which incrementally changes said load current in an inversely proportional manner with respect to incremental changes of its load voltage and substantially independently of the load current changes in any other of said modules, wherein said adjustment means comprises low-pass means for eliminating the effects of high frequency load current fluctuations above a predetermined rate from affecting the dynamic output characteristics of said module, said regulator means further comprising first and second reference voltage means wherein said adjustment means comprises first difference means coupled to receive said first reference voltage and said first signal and for developing a first output signal representative of the difference thereof, second difference means coupled to receive said second reference voltage and said first output signal and for developing a second output signal representative of the difference thereof wherein said low-pass filter means is coupled to receive said second output signal for developing a filtered third output signal, and third difference means coupled to receive said second signal and said third output signal for developing said adjustment signal which is representative of the difference thereof.

11. A regulator circuit for equalizing the load currents of a plurality of power supply modules connected in common to feed a common load, each of said modules including a modulator responsive to an externally produced pulse width signal for adjusting the duty cycle of said module, thereby to adjust the current output of said module, comprising:

current sensing means responsive to a load current of one of said modules for producing a current level signal indicative of the current output of said module, means responsive to a load voltage of said one of said modules for providing a first voltage signal corresponding thereto, pulse width generator means responsive to said current level signal and said first voltage signal for producing a pulse width signal such that said duty cycle is adjusted to incrementally decrease the regulated load voltage of said module with an increase in current output, and to incrementally increase the regulated load voltage with a decrease in current output, and means for applying said pulse width signal to said modulator, so that the duty cycle of said one module is adjusted to substantially equalize the load current thereof with each other of said plurality of power supply modules, each of said modules being adjusted substantially independently of the current provided by all of the others and having substantially equal regulated output voltages, said current sensing means further comprising means responsive to said current level signal for providing a second voltage signal proportional thereto, means for providing a predetermined reference voltage, and first circuit means responsive to a difference of said predetermined reference voltage and said second voltage signal for providing an error signal representative thereof, said pulse width generator means further comprising second circuit means responsive to a difference of said error signal and said first voltage signal for producing said pulse width signal, said second circuit means providing a pulse width at a predetermined repetition rate and said pulse width linearly proportional to said difference, said regulator circuit further comprising low-pass filter means for receiving said error signal and responsive to frequency differences of said error signal for passing all frequencies less than a predetermined frequency and rejecting all frequencies greater than said predetermined frequency, wherein said predetermined frequency is about 100 Hz.

12. A regulator circuit as set forth in claim 11, wherein said low-pass filter means is coupled intermediate said first circuit means and said second circuit means.

13. A regulator circuit as set forth in claim 12, wherein said current sensing means comprises an impedance element coupled in series with said load current of said one of said power supply modules, and said current level signal is produced by sensing the voltage difference developed across said impedance element.

14. A regulator circuit as set forth in claim 13, wherein said current sensing means further comprises an operational amplifier having a first input coupled to said sensed voltage difference, a second input for providing an offset bias, and an output coupled to said first circuit means, for producing said second voltage signal.

15. A regulator circuit as set forth in claim 16, wherein said first circuit means comprises a further operational amplifier having a first input coupled to receive said predetermined reference voltage, a second input opposing said first input coupled to receive said second voltage signal, and an output coupled to an input terminal of said low-pass filter.

16. A regulator circuit as set forth in claim 15, wherein said low-pass filter means further comprises an output terminal for providing a filtered error signal independent of high frequency signal components to a first input terminal of said second circuit means.

17. A regulator circuit as set forth in claim 16, wherein said second circuit means comprises an operational amplifier having a second input terminal opposing said first input terminal and coupled to receive said first voltage signal.

* * * * *